(12) United States Patent
Joly

(10) Patent No.: US 7,400,784 B2
(45) Date of Patent: Jul. 15, 2008

(54) SEARCH OF SIMILAR FEATURES REPRESENTING OBJECTS IN A LARGE REFERENCE DATABASE

(75) Inventor: Alexis Joly, Paris (FR)

(73) Assignee: Institut National de l'Audiovisuel-INA (FR)

( * ) Notice: Subject to any disclaimer, the term of this patent is extended or adjusted under 35 U.S.C. 154(b) by 695 days.

(21) Appl. No.: 10/968,624

(22) Filed: Oct. 19, 2004

(65) Prior Publication Data

US 2006/0083429 A1    Apr. 20, 2006

(51) Int. Cl.
*G06K 9/54* (2006.01)
*G06F 7/00* (2006.01)

(52) U.S. Cl. ............................................ 382/305; 707/3
(58) Field of Classification Search .................. 382/305, 382/190, 260, 173; 707/1, 3, 100; 702/102; 345/581
See application file for complete search history.

(56) References Cited

U.S. PATENT DOCUMENTS

| | | | |
|---|---|---|---|
| 5,781,906 A * | 7/1998 | Aggarwal et al. ........... 707/102 |
| 6,154,746 A * | 11/2000 | Berchtold et al. ........... 707/100 |
| 6,469,749 B1 | 10/2002 | Dimitrova et al. ........... 348/722 |
| 6,470,287 B1 * | 10/2002 | Smartt ........................ 702/102 |
| 6,587,637 B2 | 7/2003 | Nagasaka et al. ............. 386/69 |
| 6,636,847 B1 * | 10/2003 | Spires ........................... 707/3 |
| 6,642,929 B1 * | 11/2003 | Essafi et al. ................. 345/581 |
| 6,988,093 B2 * | 1/2006 | Pic et al. ........................ 707/1 |
| 7,167,856 B2 * | 1/2007 | Lawder ........................ 707/3 |

* cited by examiner

*Primary Examiner*—Kanji Patel
(74) *Attorney, Agent, or Firm*—DLA Piper US LLP

(57) ABSTRACT

This invention is a method dedicated to pseudo-invariant features retrieval and, more particularly, applied to content-based copy identification. The range of a query is computed during the search according to deviation statistics between original and observed features. This approximate search range is directly mapped onto a Hilbert's space-filling curve allowing an efficient access to the database. Such a method is sublinear in database size and does not suffer from dimensionality problems.

15 Claims, 4 Drawing Sheets

K=4 (16 points)

K=4 (16 points)

Space partition for D=2, K=4 and p=4

Space partition for D=2, K=4 and p=3 and motion coefficients of the frame, or DC and AC coefficients of the frame. A given extracted signature may alternatively be an audio signature based at least in part on a characteristic of an audio signal associated with a portion of the video segment. Other types of signatures can also be used. That method allows the identification and extraction of particular video content to be implemented with significantly reduced amounts of memory and computational resources.

SEARCH OF SIMILAR FEATURES REPRESENTING OBJECTS IN A LARGE REFERENCE DATABASE

FIELD OF THE INVENTION

This invention relates generally to a method for searching features representing objects and, more particularly, to a video retrieval system for searching similar video objects in a large database.

BACKGROUND

Many video content-based copy identification systems have been developed to compare a broadcasted video program to a reference video database.

For example, U.S. Pat. No. 6,469,749 discloses a method to identify video segments that are likely to be associated with a commercial or other particular type of video content. A signature is extracted from each of the segments so identified, and the extracted signatures are used, possibly in conjunction with additional temporal and contextual information, to determine which of the identified segments are in fact associated with the particular video content. One or more of the extracted signatures may be, e.g., a visual frame signature based at least in part on a visual characteristic of a frame of the video segment, as determined using information based on DC and motion coefficients of the frame, or DC and AC coefficients of the frame. A given extracted signature may alternatively be an audio signature based at least in part on a characteristic of an audio signal associated with a portion of the video segment. Other types of signatures can also be used. That method allows the identification and extraction of particular video content to be implemented with significantly reduced amounts of memory and computational resources.

Another system is described in U.S. Pat. No. 6,587,637 in which video images are retrieved by sequentially inputting images for each frame, sequentially extracting features from the inputted frame images, converting the features sequentially extracted into a feature series corresponding to the inputted frame image series, compressing the feature series in the direction of the time axis, storing the compressed feature series in the storage, sequentially extracting features separately from the images to be retrieved for each inputted frame, sequentially comparing the features of the images to be retrieved for each frame with the stored compressed feature series, storing the progress state of this comparison, updating the stored progress state of the comparison on the basis of a comparison result with the frame features of the succeeding images to be retrieved, and retrieving image scenes matching with the updated progress state from the images to be retrieved on the basis of the comparison result between the updated progress state and the features of the images to be retrieved for each frame.

In a public document entitled "Robust Content-Based Video Copy Identification in a Large Reference Database" disclosed in 2003 during the Internation Conference on Image and Video Retrieval (CIVR), a novel scheme for video content-based copy identification dedicated to TV broadcast with a reference video database exceeding 1000 hours of video was disclosed. It enables the monitoring of a TV channel in soft real-time with a good tolerance to strong transformations that one can meet in any TV post-production process like: clipping, cropping, shifting, resizing, objects encrusting or color variations. Contrary to most of the existing schemes, the recognition is not based on global features but on local features extracted around interest points. This allows the selection and the localization of fully discriminant local patterns which can be compared according to a distance measure. In the disclosed document, retrieval is performed using an efficient approximate Nearest Neighbors search and a final decision based on several matches cumulated in time.

As for many content based retrieval systems and as seen in the above-mentioned prior art, one of the difficult tasks is the cost to search similar objects in a large database DB.

SUMMARY OF THE INVENTION

This invention relates to a method for statistically searching a target feature Y representative of a certain category of object in a large D-dimensional reference database of size N including reference features $(X_1, X_2, \ldots, X_N)$ representative of the category including (i) indexing the database using an ordered space partitioning into blocks to obtain a one-dimensional index; (ii) filtering the partitioned database to obtain a sub-set $S_\alpha$ of the database including reference features whose probability that they represent the same object as Y, given the target feature Y, is more than a threshold $\alpha$; and (iii) searching among the blocks forming the sub-set at least one closest reference feature for the target feature.

This invention also relates to a method for statistically searching a target feature Y representative of a category of object in a large D-dimensional reference database of size N including reference features $(X_1, X_2, \ldots, X_N)$ representative of the category of object including (i) filtering the database to obtain a sub-set $S_\alpha$ of the database within a volume $V_\alpha$ including reference features whose probability that they represent the same object as Y, given the target feature Y, is more than a threshold $\alpha$, the filtering step including the following sub-steps of indexing the database with a Hilbert's filling curve to obtain a one-dimensional index, regularly partitioning the index into $2^P$ intervals corresponding to a space partition of $2^P$ hyper-rectangular blocks, and defining volume $V_\alpha$ as a partition of a plurality of the hyper-rectangular blocks; and (ii) searching among the hyper-rectangular blocks forming the sub-set at least one closest reference feature for the target feature.

DETAILED DESCRIPTION

Figure 1:
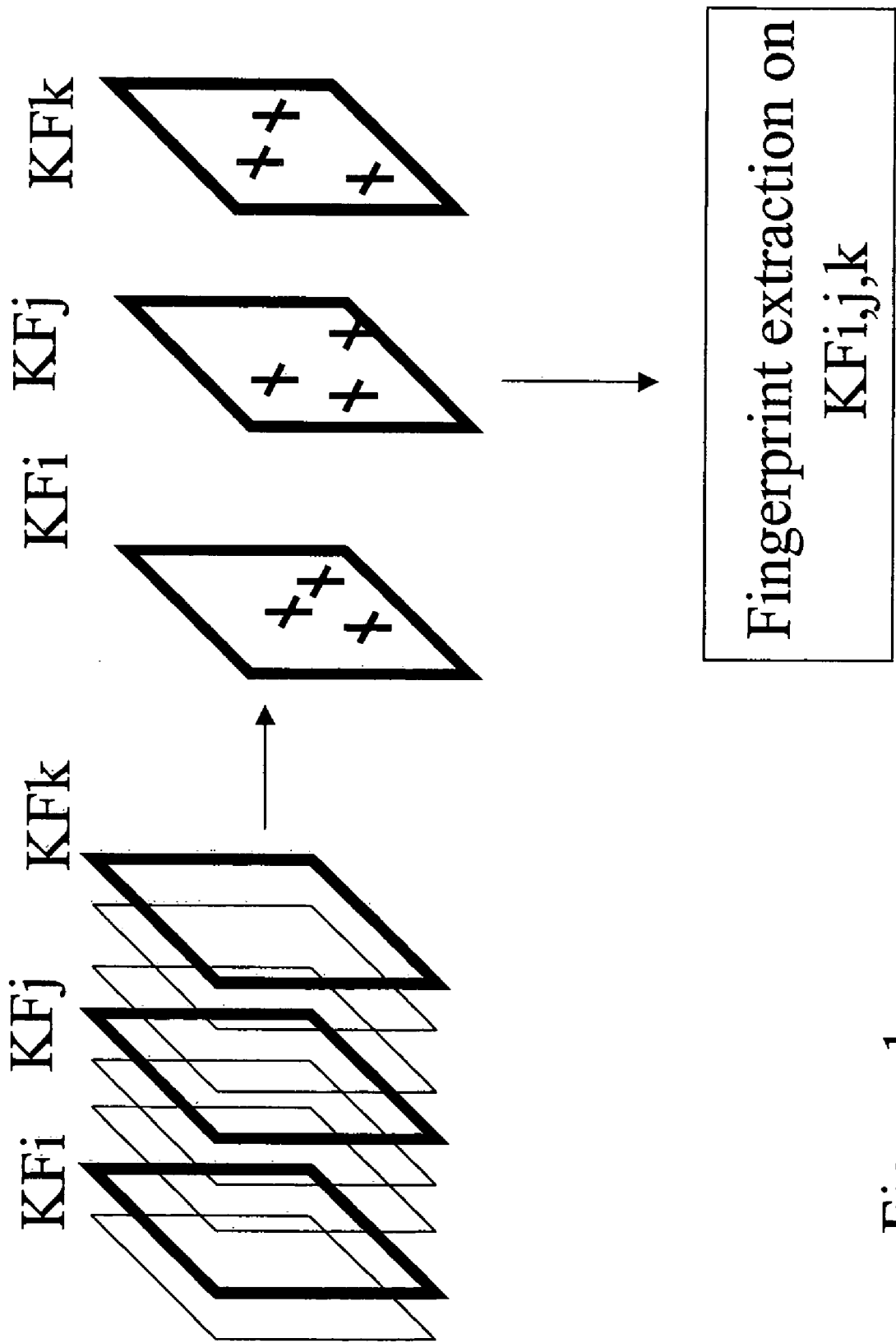
FIG. 1 is a schematic diagram representing the fingerprints extraction in a video stream.

The invention provides a novel method dedicated to pseudo-invariant features retrieval and, more particularly, applied to content-based copy identification. The range of a query is computed during the search according to deviation statistics between original and observed features. Furthermore, this approximate search range is directly mapped onto a Hilbert's space-filling curve allowing efficient access to the database. Such a method is sublinear in database size and does not suffer from a dimensionality problem.

The invention provides a method for statistically searching a target feature Y representative of a certain type of object in a large D-dimensional reference database of size N comprising reference features $(X_1, X_2, \ldots, X_N)$ representative of the type of object, comprising the steps of:

(i) indexing the database using an ordered space partitioning into blocks to obtain a one-dimensional index;

(ii) filtering the partitioned database to obtain a sub-set $S_\alpha$ of the database comprising the reference features whose probability that they represent the same object as Y, given the target feature Y, is more than a threshold $\alpha$; and (iii) searching among the blocks forming the sub-set at least one closest reference feature for the target feature.

In a preferred aspect, the ordered space partitioning is obtained using a Hilbert's filling curve and is composed of hyper-rectangular blocks. Advantageously, the number of said blocks of the partitioning depends on the size of the reference database and the performance of the computer used.

In another preferred aspect, the type of object is a video stream, the feature is at least one fingerprint representative of the video stream and the fingerprint comprises a local description of a point of interest of a frame. Advantageously, the point of interest is detected using Harris detector and the fingerprint is detected in a selected key-frame wherein the key-frame is selected by calculating the extrema of the intensity of motion function. Advantageously, the feature comprises a spatio-temporal description of a point of interest of a frame.

In yet another preferred aspect, several searches of target features corresponding to contiguous or near-contiguous frames within the video stream are elected as a confirmed result.

Advantageously, several searches of target features corresponding to contiguous or near-contiguous frames within the video stream are used to confirm the raw results with the following steps:

(i) estimation of the transformations between target and reference video streams; and (ii) computation of a so-called "similarity measure" representing the number of interest points matched between the target and reference video streams.

The invention is also related to a method for statistically searching a target feature Y representative of a certain type of object in a large D-dimensional reference database of size N comprising reference features $(X_1, X_2, \ldots, X_N)$ representative of the type of object, comprising the steps of:

(i) filtering the database to obtain a sub-set $S_\alpha$ of the database within a volume $V_\alpha$ comprising the reference features whose probability that they represent the same object as Y, given the target feature Y, is more than a threshold $\alpha$, the filtering step comprising the following sub-steps:

indexing the database using a Hilbert's filling curve to obtain a one- dimensional index;

regularly partitioning the index into $2^p$ intervals corresponding to a space partition of $2^p$ hyper-rectangular blocks; and defining the volume $V_\alpha$ as a partition of a plurality of the hyper-rectangular blocks; and (ii) searching among the hyper-rectangular blocks forming the sub-set at least one closest reference feature for the target feature.

Turning now to the drawings, FIG. 1 shows the fingerprint extraction in a video stream. The fingerprint extraction includes a key-frame detection, an interest point detection in these key-frames and the computation of local differential descriptors around each interest point.

The key-frame detection is based on the mean of the frames differences, also called "intensity of motion," defined by:

$$a(t) = \frac{\sum_{x=1}^{X} \sum_{y=1}^{Y} |I(x, y, t+1) - I(x, y, t)|}{XY}$$

where X and Y are image dimensions. After applying a Gaussian filter, the extrema of a(t) are used to select the key-frames.

The interest point within the key-frames is computed using a Harris detector computed using Gaussian derivative filters. As shown in the publication from the International Conference on Computer Vision 1998 entitled "Comparing and evaluating interest point" (Schmid, Mohr, Bauckhage), the stable version of the detectors is known to be efficient according to two criteria: the repeatability that measures the geometric stability under several transformations (including scale changes and illumination variations) and the information content measured by the entropy of differential operators computed around the interest points.

With these interest points from the detected keyframes, a local fingerprint is now computed. Since the information content of the stable Harris detector is high for differential features, a Gaussian differential decomposition of the grey-level 2D signal is used until the second order:

$$f = \left(\frac{\partial I}{\partial x}, \frac{\partial I}{\partial y}, \frac{\partial^2 I}{\partial x \partial y}, \frac{\partial^2 I}{\partial x^2}, \frac{\partial^2 I}{\partial y^2}\right)$$

Since any ratio between two derivatives is invariant to contrast variations, the normalized feature vector $f/\|f\|$ is used. Moreover, to include some temporal information, this feature vector is computed at three other instants around the current key-frame, but not at the same position to avoid redundancy in the frequent case of still scenes. The direction of the spatial shift is different for each temporal shift. Finally, a 5*(1+3) =20-dimensional fingerprint F is obtained.

These particular features are either used as a reference and entered in a reference DataBase (DB) or constitute a target feature to be searched among a reference DB.

In the case of a search, the new method of retrieval is used on the 20-dimensional signatures. However, it must be understood that the search method does not depend on the nature of the signature or the feature, and the dimension of the space to search.

Figure 2:
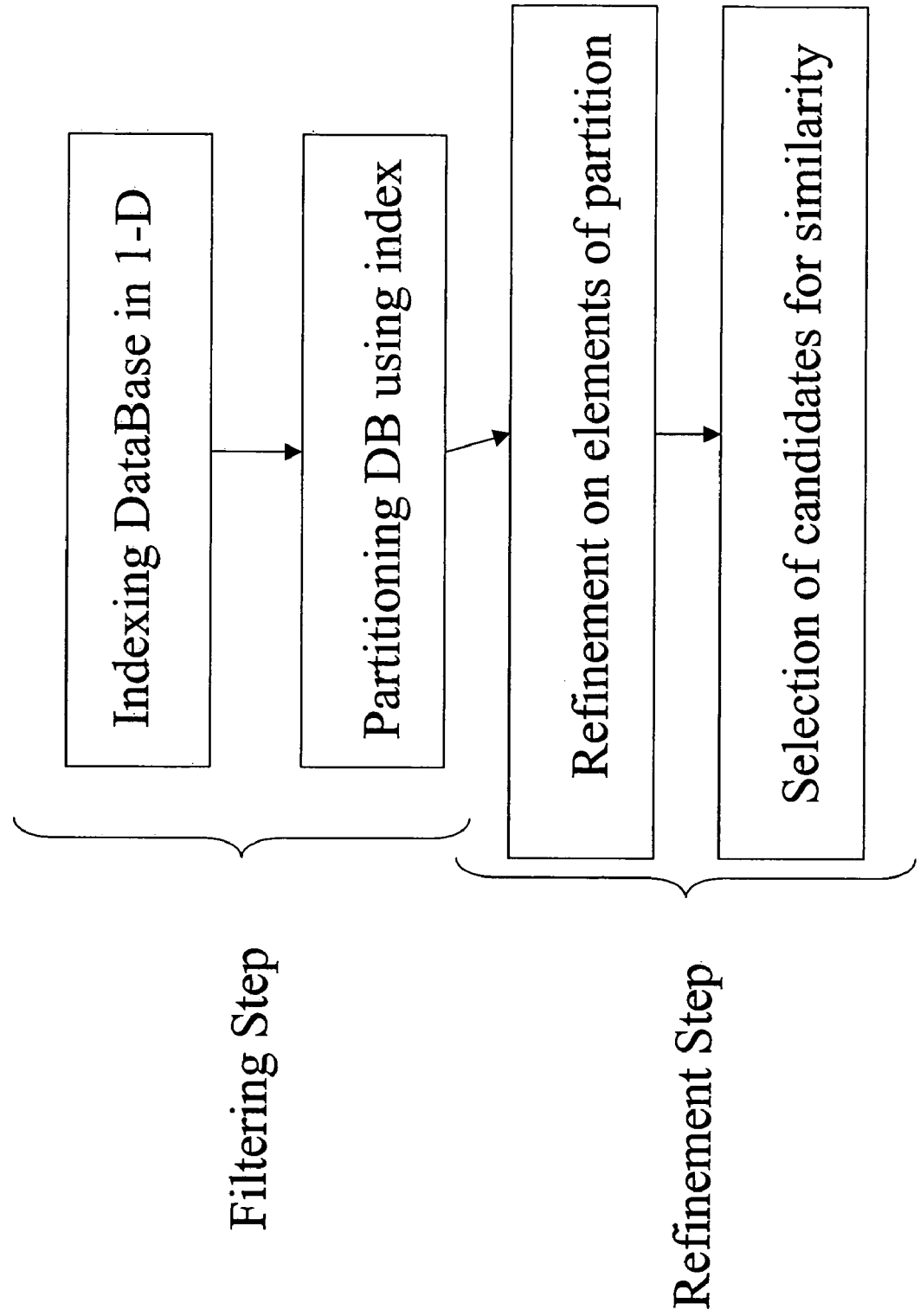
FIG. 2 is a block diagram of the search method according to the invention.

Most of spatial access methods in multidimensional feature space comprise a filtering step and a refinement step as shown in FIG. 2. The refinement step is generally the same process that would be used with a naive sequential scan, but it is applied only to parts of the database selected by the filtering step. For content based copy identification, the filtering step is adapted to the expected distortions with statistical based queries. For a given signature, the idea is to predict a region of space where the probability to find the eventual referenced signatures of same objects is superior to a fixed threshold $\alpha$. Formally, for a given query Y and a user defined probability $\alpha$, the filtering step includes finding the set $S_\alpha$, of all signatures contained in the hyper-volume $V_\alpha$ such as:

$$\int_{V_\alpha} p(X/Y) dV \geq \alpha$$

where p(X/Y) is the probability density fonction that X and Y are signatures of the same object, given Y.

The refinement step is then processed on $S_\alpha$. This process can be a k-NN (Nearest-Neighbors) search, a range search, or both.

Figure 3:
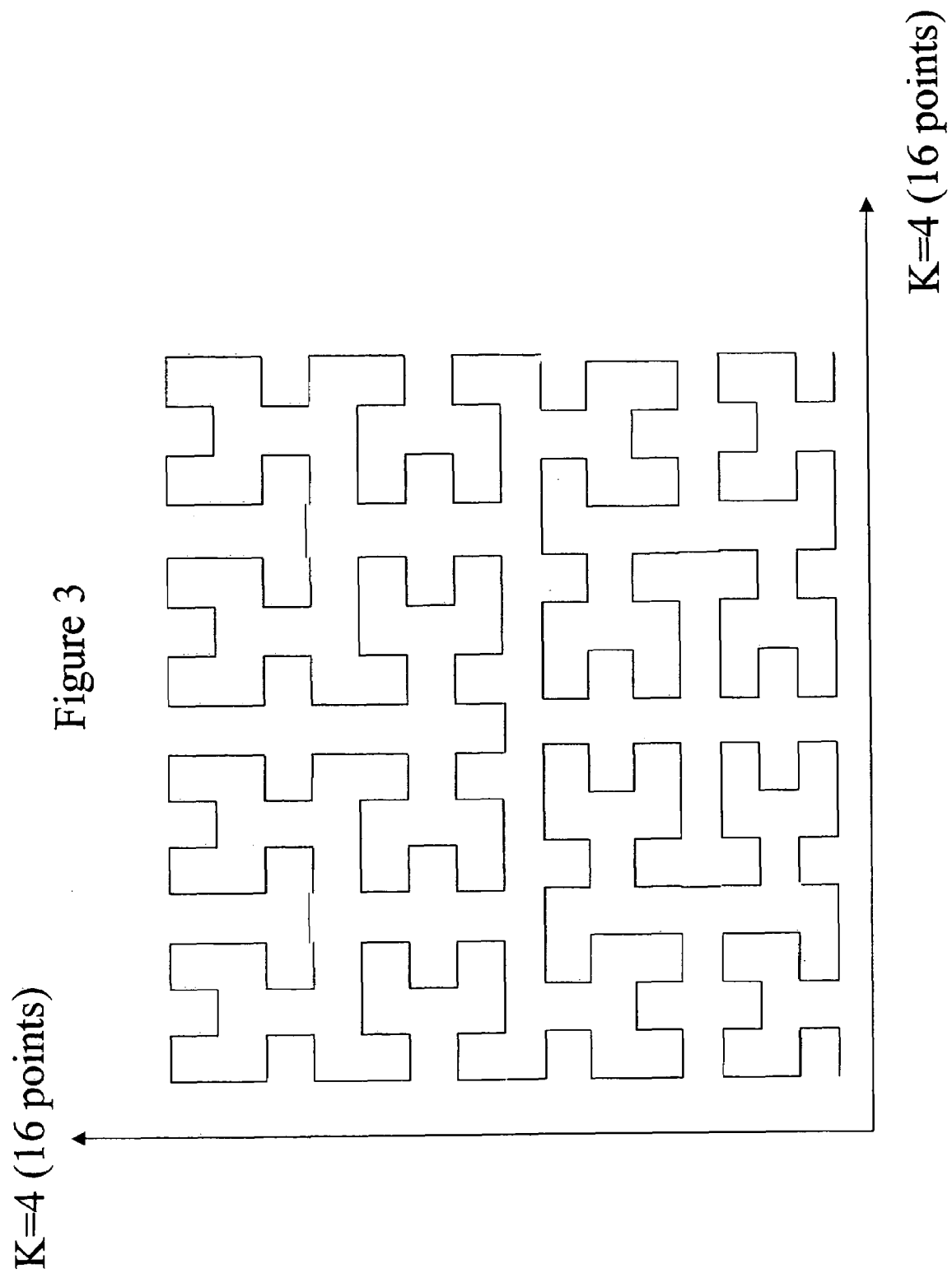
FIG. 3 is an example of a Hilbert's curve filing a 2D space.

As shown in FIG. 2, the filtering method is based on a Hilbert's space filling curve. In a D-dimensional grid space (D=20 for the above fingerprints), the K-th order approximation of Hilbert space filling curve $H_D^K$ is a bijective mapping: $[0,2^K-1]^D \Leftrightarrow [0,2^{KD}-1]$ used for points $X=(x_1, \ldots, x_D)$ represented by D words of K bytes. Such a curve is, for example, constructed by a Butz algorithm and shown in FIG. 3 for D=2 and K=4.

For a video content database, depending on the size of the specific extracted feature, the space refers to greylevels: $[0,255]^D$ and we consider that $p(x_j/y_j)=p(x_j-y_j)$ j=1,D, with, for example, a zero-mean Gaussian distribution with constant deviation for the probability density fonction p.

The main idea of that method is that as $H_D^K$ is bijective, a 1-dimension index for the search can be made in the 1 dimension space rather than in the 20 dimensions space, using the essential property that two neighboring intervals on the curve always remain neighboring cells in the grid space.

Figure 4:
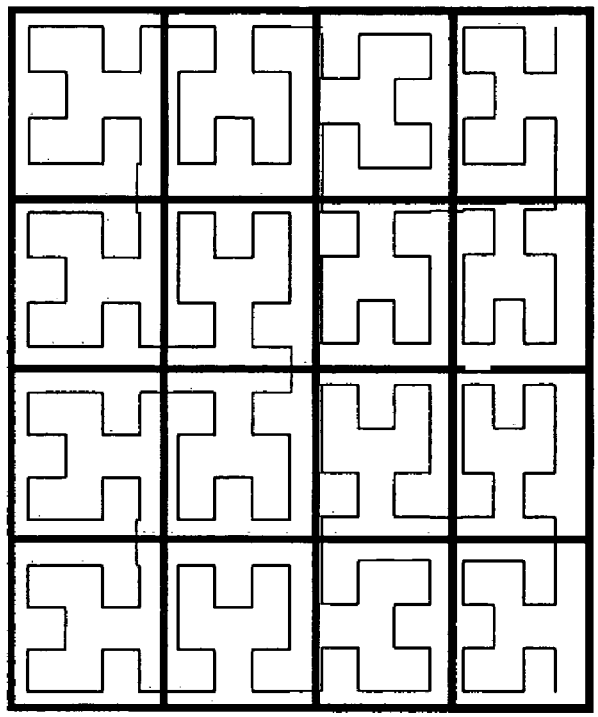
FIG. 4 is a space partition for D=2 and K=4 at different depths.
Figure 4:
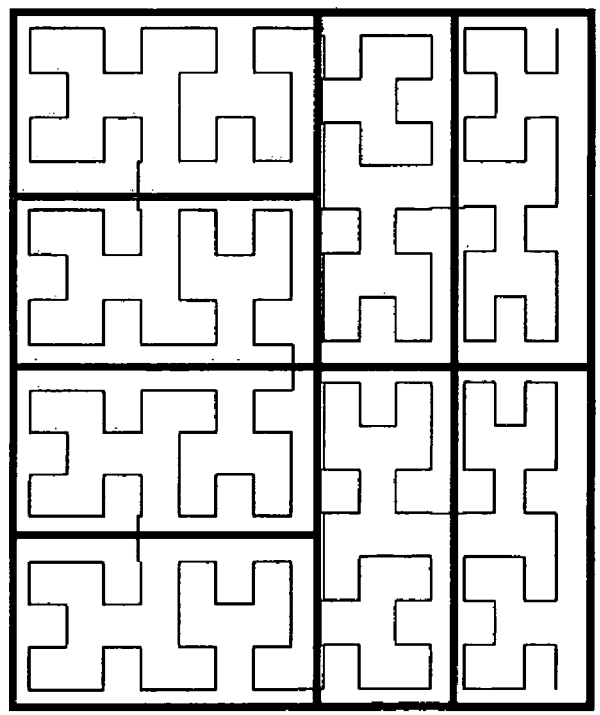

A regular partition of the curve in $2^p$ intervals is now made, for example, by using some intermediate variables of a Butz algorithm. Parameter p is called the depth of the partition. FIG. 4 shows such a partition for D=2, K=4 and p=3, 4. The space partition is a set of $2^p$ hyper-rectangular blocks, called p-blocks of same volume and shape, but of different orientations.

For such a p-partitioned space, the inequality characterizing the filtering step is then solved for the hyper-rectangular blocks $$\sum_{i=1}^{Card(B\alpha)} \int_{bi} p(X/Y) dV \geq \alpha$$

where $B_\alpha = \{p\text{-blocks } b_i: i<Card(B_\alpha)+1\}$ and $Card(B_\alpha)<2^p+1$.

$Card(B_\alpha)$ is at a minimum to limit the cost of the search. After such a partition, the volume $V_\alpha$ is then defined as the union of hyper-rectangular blocks. These blocks define a partition of $V_\alpha$ on which the refining step is applied. As mentioned above, this process can be a k-NN (Nearest-Neighbors) search, a range search, or both and at least one closest reference is defined according to these methods given a distance d, for example, with $L^2$-metric. It has to be noted that this refinement step is applied on the different blocks containing each, $N/2^p$ points if the distribution is uniform.

The parameter p is of major importance since it directly influences the response time of our method, with for example:

$$T(p)=T_{filt}(p)+T_{ref}(p)$$

with T(p), the response time depending on p, $T_{filt}(p)$, the filtering time strictly increasing with p, and $T_{ref}(p)$, the refinement time clearly decreasing with p ($Card(S_\alpha)$ decreases with p).

In order to minimize T(p), we choose a parameter $p_{min}$ depending on the size N (for example number of signatures) of the database:

$$p_{min}=const+\log_2(N)$$

where const is independent of the size N of the database and can be evaluated according to the performance of the host computer.

With such a partitioning method and the above $p_{min}$ characterizing the partition, the response time is sublinear in database size and is much better than with a classical sequential scan.

Once a number N of candidates have been selected, a decision is made to know whether or not the candidates correspond to the reference object. This decision is made by using metadata associated with the features. For example, referring to the method described above, the fingerprints corresponding to the key-frames and the points of interest are associated to an identification of the video stream Id, and a description of the point of interest where the fingerprint is calculated. This description can be represented as a vector P, having 2 or 3 dimension, if we consider a time code or not.

As a result, the database comprises N fingerprints $F_i$, to which are attached an identification reference $Id_i$, and a position vector $P_i$, for i between 1 and N. Thus, for each signature fingerprint $F_j$, the above described search method produces a set of $K_j$ similar signature candidates $F_{jk}$ for k between 1 and $K_j$. For each signature, the system outputs metadata $Id_{jk}$ and $P_{jk}$.

One can easily see that an incomplete decision can be made by counting the number of identical $Id_{jk}$ for the set of candidates $S_{jk}$. However, this method does not take into account the geometrical transformations on the images. According to this invention, the decision is made first by gathering the candidate objects having the same Id into a set S, and second by selecting within this set, the objects whose distance to the target position vectors $P_j$ is minimum, given a set of geometrical transformations (translations, resealing, . . . ). As a result, the decision process is more robust to geometrical transformations.

It should be understood that the above described aspects of the invention are intended to be illustrative only and do not limit the breadth of the invention as defined in the appended claims. For example, the invention can be used with any search of similar objects in a large database, and not only with the above mentioned 20-dimension video fingerprints.

The invention claimed is:

1. A method for statistically searching a target feature Y representative of a certain category of object in a large D-dimensional reference database of size N comprising reference features $(X_1, X_2, \ldots, X_N)$ representative of the category comprising:
   (i) indexing the database using an ordered space partitioning into blocks to obtain a one-dimensional index;
   (ii) filtering the partitioned database to obtain a sub-set $S_\alpha$ of said database comprising reference features whose probability that they represent the same object as Y, given the target feature Y, is more than a threshold $\alpha$; and
   (iii) searching among the blocks forming the sub-set at least one closest reference feature for the target feature.

2. The method according to claim 1, wherein the ordered space partitioning is obtained using a Hilbert's filling curve.

3. The method according to claim 1, wherein the ordered space partitioning is composed of hyper-rectangular blocks.

4. The method according to claim 1, wherein the number of the blocks of the partitioning depends on the size of the reference database.

5. The method according to claim 1, wherein the number of the blocks of the partitioning depends on performance of the computer.

6. The method according to claim 1, wherein the category is a video stream.

7. The method according to claim 6, wherein the feature is at least one fingerprint representative of the video stream.

8. The method according to claim 7, wherein the fingerprint comprises a local description of a point of interest of a frame.

9. The method according to claim 8, wherein the point of interest is detected using a Harris detector.

10. The method according to claim 8, wherein the fingerprint is detected in a selected key-frame.

11. The method according to claim 10, wherein the key-frame is selected by calculating extrema of intensity of motion function.

12. The method according to claim 8, wherein the feature comprises a spatio-temporal description of a point of interest of a frame.

13. The method according to claim 7, wherein several searches of target features corresponding to contiguous or near-contiguous frames within the video stream are elected as a confirmed result.

14. The method according to claim 7, wherein several searches of target features corresponding to contiguous or near-contiguous frames within the video stream are used to confirm raw results comprising:
(i) estimating transformations between target and reference video streams; and
(ii) computing a similarity measure representing the number of interest points matched between the target and reference video streams.

15. A method for statistically searching a target feature Y representative of a category of object in a large D-dimensional reference database of size N comprising reference features $(X_1, X_2, \ldots, X_N)$ representative of the category of object comprising:
(i) filtering the database to obtain a sub-set $S_\alpha$ of the database within a volume $V_\alpha$ comprising reference features whose probability that they represent the same object as Y, given the target feature Y, is more than a threshold $\alpha$, the filtering step comprising the following sub-steps of:
indexing the database with a Hilbert's filling curve to obtain a one-dimensional index;
regularly partitioning the index into $2^p$ intervals corresponding to a space partition of $2^p$ hyper-rectangular blocks; and
defining volume $V_\alpha$ as a partition of a plurality of the hyper-rectangular blocks; and
(ii) searching among the hyper-rectangular blocks forming the sub-set at least one closest reference feature for the target feature.

* * * * *